US009187812B2

(12) United States Patent
Hofmann et al.

(10) Patent No.: US 9,187,812 B2
(45) Date of Patent: Nov. 17, 2015

(54) THERMOPLASTIC JOINING AND ASSEMBLY OF BULK METALLIC GLASS COMPOSITES THROUGH CAPACITIVE DISCHARGE (75) Inventors: Douglas C. Hofmann, Pasadena, CA (US); Scott N. Roberts, Pasadena, CA (US); Henry Kozachkov, Pasadena, CA (US); Marios D. Demetriou, Los Angeles, CA (US); Joseph P. Schramm, Albany, CA (US); William L. Johnson, San Marino, CA (US)

(73) Assignee: California Institute of Technology, Pasadena, CA (US)

(*) Notice: Subject to any disclaimer, the term of this patent is extended or adjusted under 35 U.S.C. 154(b) by 396 days.

(21) Appl. No.: 13/418,093

(22) Filed: Mar. 12, 2012

(65) Prior Publication Data

US 2012/0288728 A1 Nov. 15, 2012

Related U.S. Application Data (60) Provisional application No. 61/451,495, filed on Mar. 10, 2011.

(51) Int. Cl.
*C22C 45/00* (2006.01)
*B23K 11/11* (2006.01)
*B23K 11/18* (2006.01)
*B23K 11/00* (2006.01)

(52) U.S. Cl.
CPC .............. *C22C 45/00* (2013.01); *B23K 11/002* (2013.01); *B23K 11/11* (2013.01); *B23K 11/18* (2013.01); *Y10T 428/1234* (2015.01); *Y10T 428/12347* (2015.01)

(58) Field of Classification Search
None
See application file for complete search history.

(56) References Cited

U.S. PATENT DOCUMENTS

| 4,013,210 | A | | 3/1977 | Deminet |
|---|---|---|---|---|
| 5,324,913 | A | * | 6/1994 | Oberg et al. ............. 219/121.63 |
| 5,482,580 | A | * | 1/1996 | Scruggs et al. .............. 148/528 |
| 5,897,796 | A | * | 4/1999 | Forrest ..................... 219/121.64 |
| 6,652,679 | B1 | * | 11/2003 | Inoue et al. .................... 148/561 |
| 6,669,793 | B2 | * | 12/2003 | Hays ............................ 148/561 |
| 6,771,490 | B2 | * | 8/2004 | Peker et al. ............. 361/679.34 |
| 7,883,592 | B2 | * | 2/2011 | Hofmann et al. ............. 148/561 |
| 2007/0113933 | A1 | | 5/2007 | Munir et al. |
| 2007/0256760 | A1 | | 11/2007 | Eckert et al. |
| 2008/0135167 | A1 | | 6/2008 | Simmons et al. |
| 2008/0251164 | A1 | * | 10/2008 | Lohwongwatana et al. .. 148/528 |
| 2009/0000707 | A1 | | 1/2009 | Hofmann et al. |
| 2009/0032970 | A1 | | 2/2009 | Park et al. |
| 2009/0236017 | A1 | | 9/2009 | Johnson et al. |
| 2011/0027609 | A1 | * | 2/2011 | Sohn et al. .................... 428/615 |
| 2012/0094141 | A1 | | 4/2012 | Kawamura et al. |

FOREIGN PATENT DOCUMENTS

JP 2010227940 10/2010

OTHER PUBLICATIONS

International Search Report and Written Opinion dated Jun. 28, 2012, PCT/US2012/018793, 11 pages.

* cited by examiner

*Primary Examiner* — George Wyszomierski
(74) *Attorney, Agent, or Firm* — Polsinelli PC (57) ABSTRACT

Systems and methods for joining BMG Composites are disclosed. Specifically, the joining of BMG Composites is implemented so as to preserve the amorphicity of their matrix phase and the microstructure of their particulate phase. Implementation of the joining method with respect to the construction of modular cellular structures that comprise BMG Composites is also discussed.

20 Claims, 12 Drawing Sheets

THERMOPLASTIC JOINING AND ASSEMBLY OF BULK METALLIC GLASS COMPOSITES THROUGH CAPACITIVE DISCHARGE

CROSS-REFERENCE TO RELATED APPLICATION

The current application claims priority to U.S. Provisional Patent Application No. 61/451,495, filed Mar. 10, 2011, the disclosure of which is incorporated herein by reference.

FEDERAL FUNDING SUPPORT

This invention was made with government support under N00014-07-1-1115 awarded by U.S. Office of Naval Research and work under a NASA contract, and is subject to the provisions of Public Law 96-517 (35 USC 202) in which the Contractor has elected to retain title. The government has certain rights in the invention.

FIELD OF THE INVENTION

The present invention generally relates to metallic joining; and more particularly to the semi-solid joining of bulk metallic glass composites.

BACKGROUND

The process of joining of two discrete pieces of material, especially metals, is undoubtedly fundamental to engineering and is often the basis for the construction of various engineered structures. Indeed, the ability to join discrete pieces of metal has enabled the production of a host of structures that would not otherwise be capable of manufacture.

A number of methods have been developed to join two materials, each being useful in certain applications. For example, welding is one such method. Generally, welding involves: placing two metallic pieces in contact with one another; locally melting them at their point of contact; allowing the molten metals to coalesce; and then allowing the newly joined configuration to cool and solidify. Ideally, since the metals solidify after having coalesced into one another, the strength of the bond will be at least as great as, if not greater than, that of either constituent metal. A filler material may also be utilized during the melting stage to facilitate the welding process.

Many techniques can be employed to weld two materials together, including spot-welding, soldering and brazing. Spot welding is a common technique that is effectuated by passing a current through the materials to be joined. The resistance inherent to the joint causes the temperature of the joint to be raised to the extent that the constituent metals melt and coalesce into one another.

Soldering is another prominent method used to join two materials. Unlike welding, soldering does not require melting either of the constituent metallic pieces. Instead, the pieces are arranged in a desired to-be-joined configuration, and an additional filler metallic alloy ("solder") is placed at the desired point of joining between the constituent metals and melted. The molten solder locally envelopes both metallic pieces, solidifies as it cools, and thereby affixes the two constituent metals together. Note that the solder has to have a melting point lower than either of the constituent metals so that the process of melting the solder does not simultaneously melt any constituent metal. Finally, brazing is yet another prominent method used to join two metals. Brazing is like soldering, except that the filler metallic alloy ("braze alloy") typically has a much higher melting point than typical solder. Thus, brazing and soldering are used in different application.

Whereas methods of joining have long been in use, Bulk Metallic Glasses ("BMGs") are a relatively new engineering development. BMGs are metallic alloys that do not have a crystalline structure; instead, like glass, their structure is amorphous. (See e.g., U.S. Pat. Pub. US 2009/0236017 A1, the disclosure of which is incorporated herein by reference.) They are generally formed by raising specific alloys above their respective glass transition temperature, and cooling them at a sufficiently fast cooling rate ("critical cooling rate") so that they do not have time to crystallize while above the glass transition temperature; instead, they are cooled quickly enough that they solidify in an amorphous glass-like structure (i.e. re-vitrify). BMGs have a number of beneficial material properties that make them viable for use in any number of engineering applications—some of these properties include: high strength, elasticity, corrosion resistance, and processability from the molten state.

Although BMGs have improved materials properties, their non-crystalline microstructure makes them susceptible to damage by conventional joining techniques. (See e.g., U.S. Pat. No. 4,115,682, the disclosure of which is incorporated herein by reference.) Specifically, conventional joining techniques typically require significantly heating the joint to the extent that some material (e.g., the constituent materials, solder, or braze alloy) is melted. Since conventional joining techniques are typically unconcerned with achieving a critical cooling rate, they risk annealing the amorphous microstructure of BMGs, and thereby eliminating their useful properties. (See e.g., U.S. Pat. No. 4,115,682, cited above.) Fortunately, specific methods for joining these BMGs have been developed. For instance, U.S. Pat. No. 4,115,682 discloses using a process akin to spot welding that specifically ensures that after heating is applied to the joint, it is allowed to cool quickly enough to enable the formation of the amorphous structure. Yavari et al. also disclose a method similar to spot welding to join to BMGs together. (See Yavari et al. Materials Research Society Symposium and Proceedings, 644 (2001) L12-20-1, the disclosure of which is incorporated herein by reference.) Similarly, U.S. Pat. No. 6,818,078 discloses a method of joining a BMG with a conventional crystalline metal with a different melting point by "melting" the material with the lower melting temperature and casting it against the other material—in the case that the material to be melted is the BMG, the BMG must then be cooled sufficiently fast to re-form the amorphous structure. (See U.S. Pat. No. 6,818,078, the disclosure of which is incorporated herein by reference.)

Even though BMGs possess promising material traits, they also have notable shortcomings that limit their viability as engineering materials. For instance, typical BMGs lack appreciable tensile ductility—instead, typical BMGs fail ungracefully exhibiting essentially zero plastic tensile strain. (See e.g., U.S. Pat. No. 7,883,592, the disclosure of which is incorporated herein by reference.) Thus, BMG Composites have been developed to address these deficiencies. BMG Composites are materials that have BMGs as an underlying matrix, but also include at least one other phase, the presence of which is understood to enhance material properties. Moreover, U.S. Pat. Pub. 2011/0203704 discloses how to precisely develop secondary phases within a BMG matrix in a highly controlled manner so as to optimize the composite's material properties. Specifically, it discusses methods for developing inhomogeneities within a BMG matrix that are of specific stiffness and size such that they promote shear band intersection and multiplication thereby inhibiting crack formation and propagation. As such, they allow for vastly improved properties. (See U.S. Pat. Pub. 2011/0203704, the disclosure of which is incorporated herein by reference.)

As BMG Composites are essentially an enhanced version of BMGs, they are even more promising for a host of engineering applications. However, methods for adjoining BMG composites that preserve their vital secondary phase microstructure have yet to be developed. Therefore, there arises a need to develop methods of joining BMG Composites that specifically preserve the secondary phase microstructures that underlie their enhanced material properties.

SUMMARY OF THE INVENTION

The current invention is directed to systems and methods related to the semi-solid joining of bulk metallic glass composites.

One embodiment of the invention is a method for joining a plurality of objects that includes:
i. providing a plurality of objects, each object having at least one metallic glass portion, wherein at least one of the metallic glass portions of at least one of the plurality of objects is formed from a bulk metallic glass composite material having both an amorphous matrix phase and at least one crystalline particulate phase;
ii. arranging the objects such that the at least one metallic glass portion of each object is in direct contact with the metallic glass portion of at least one of the other object to thereby form at least one contact point;
iii. applying a compressive load such that a force is exerted between the objects at the at least one contact point;
iv. heating an interfacial region immediately surrounding and including each of the at least one contact points to a processing temperature between the glass transition temperature and the liquidus temperature of the BMG composite such that the metallic glass portions of the plurality of objects soften and interfuse to form a joint at the at least one contact point;
v. wherein the heating and joining time is sufficiently short to inhibit crystallization of the amorphous matrix and also inhibit morphological and structural transformation of the crystalline particulate phase; and
vi. wherein the heating is sufficiently localized within the interfacial region such that the joint can be cooled via conduction through the material surrounding said interfacial region sufficiently fast to ensure re-vitrification of the amorphous matrix phase within the interfacial region.

In another embodiment of the invention, the processing temperature is sufficiently above the glass-transition temperature of the composite material such that the metallic materials of the objects have a sufficiently low viscosity to allow the materials to sufficiently interfuse under the exerted force.

In yet another embodiment, the heating is achieved via the application of a quantum of electrical energy across at least two objects. In one such embodiment the quantum of energy is supplied by rapid capacitive discharge In another embodiment, the quantum of electrical energy applied is approximately between 10 J and 100 J.

In still another embodiment, the objects are heated and joined in less than about 100 milliseconds. In another such embodiment the time is less than 10 milliseconds In a further embodiment, the amorphous matrix is heated to between the solidus and liquidus temperatures in a time less than about ten milliseconds.

In an even further embodiment, the compressive load and the heating are directly and sequentially applied wherever joints are required.

In a still further embodiment, the heating is simultaneously applied to a plurality of joints.

In a still even further embodiment, at least three of the objects are arranged in successive layers.

In another embodiment, the compressive load and heating are directly applied only to the outer layers.

In yet another embodiment, the at least one bulk metallic glass composite has a plastic zone radius of at least 1 mm.

In still another embodiment, the plurality of objects are arranged so that their joining results in a cellular solid structure.

In a further embodiment, the resulting cellular solid structure is an egg box shaped structure.

In an even further embodiment, the resulting cellular solid structure is a honeycomb-shaped structure.

In a still further embodiment, the cellular solid structure is about 90% porous.

In a still even further embodiment, the resulting cellular solid structure has a density of about 0.5 g/cc.

In a yet further embodiment, the particulate phase is homogeneously distributed throughout the composite and wherein the average spacing of the particulate phase is on the order of the plastic zone radius of the amorphous matrix phase ($R_p$).

In a yet even further embodiment, the metallic glass portions of all of the objects have sufficiently similar composition.

In a still yet further embodiment, the microstructures of all of the objects have sufficiently similar morphology.

Another embodiment of the invention is a cellular solid structure that includes: at least two objects, formed at least partially from bulk metallic glasses, wherein at least one of the bulk metallic glasses is a bulk metallic glass composite comprising an amorphous matrix phase and at least one crystalline particulate phase, the objects having at least one joint therebetween formed from the interfusion of their respective metallic glass phases, wherein there is no substantial morphological or structural difference between the particulate crystalline phase of the composite material at the joint and the particulate crystalline phase of the surrounding bulk composite material.

In yet another embodiment, the cellular solid structure is egg box shaped structure.

In still another embodiment, the cellular solid structure is honeycomb-shaped.

In a further embodiment of the invention, the cellular solid structure is about 90% porous.

In an even further embodiment of the invention, the cellular solid structure has a density of about 0.5 g/cc.

In a yet further embodiment, the particulate phase is homogeneously distributed throughout the composite and wherein the average spacing of the particulate phase is on the order of the plastic zone radius of the amorphous matrix phase ($R_p$).

In a yet even further embodiment, the metallic glass portions of all of the objects have sufficiently similar composition.

In a still yet further embodiment, the microstructures of all of the objects have sufficiently similar morphology.

BRIEF DESCRIPTION OF THE DRAWINGS

The description will be more fully understood with reference to the following figures and data graphs, which are presented as exemplary embodiments of the invention and should not be construed as a complete recitation of the scope of the invention, wherein.

DETAILED DESCRIPTION

The current invention is directed to systems and methods for achieving and implementing joints comprising BMG Composites. Generally, in accordance with embodiments of the invention, materials—at least one of which is a BMG Composite—may be joined by:
- arranging the materials so that they directly contact each other wherever joints are desired;
- applying a compressive load wherever joints are desired so that the materials to be joined exert a force against one another;
- heating the materials while the compressive load is being applied at the desired joint locations to a predetermined temperature using a heating rate that exceeds the rate at which the amorphous matrix crystallizes ("critical heating rate");
- where the predetermined temperature allows the amorphous matrix phase to soften and reach a viscosity that allows it to flow and fuse with the softened phase of at least one other BMG or BMG Composite material where the joint is desired, but at the same time does not substantially alter the crystalline particulate (dendritic) phase of the BMG Composite; and
- allowing the newly developed joints to rapidly cool so as to allow the amorphous matrix to re-vitrify within the new joint configuration.

Figure 1:
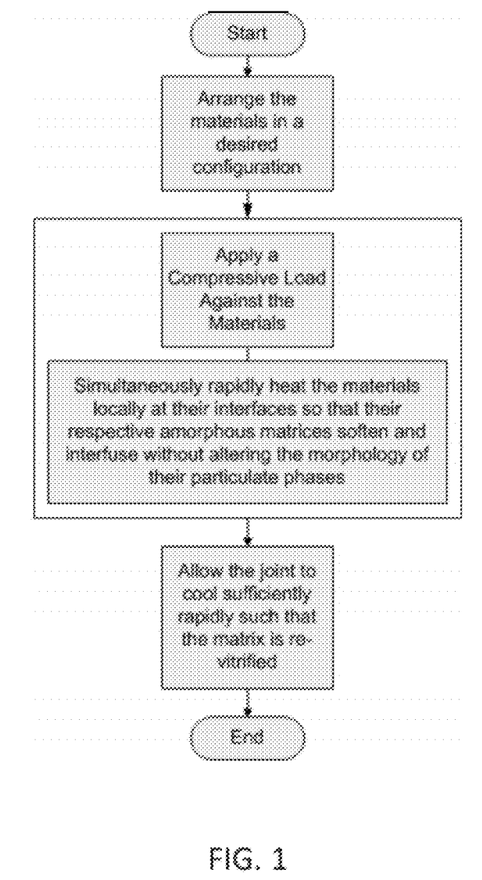
FIG. 1 illustrates a process for joining materials, at least one of which is a BMG Composite in accordance with an embodiment of the invention.

FIG. 1 depicts an embodiment of this process. As described in brief above, in contrast to conventional joining processes designed for use with standard BMG materials, the joining process of the current invention is directed specifically to the joining of BMG Composite materials. An amorphous metal composite is defined as having a matrix that is bulk metallic glass and a second (or third, or fourth, etc.) phase that exists as an inclusion. This phase could be, for example, a crystalline dendritic or spheroidal phase that does not prevent the matrix from being continuous. In joining such a material it is essential that the particulate (e.g. dendritic) microstructure of the composite be preserved. The reason for the importance of maintaining the structure and morphology of the crystalline particulate phase is that it is the nature of this phase that determines the properties of the composite.

In particular, BMG Composites have inhomogeneous microstructures incorporated within an amorphous matrix material. These inhomogeneous microstructures, sometimes with isolated dendrites, stabilize the glass against the catastrophic failure associated with unlimited extension of a shear band turning into a crack, and results in enhanced global plasticity and more graceful failure. Tensile strengths of ~1 GPa, tensile ductility of ~2-3 percent, and an enhanced mode I fracture toughness of $K_{1c} \approx 40$ MPa m$^{1/2}$ have been reported. (See, e.g., Hays, C. C., Kim, C. P. & Johnson, W. L., Phys. Rev. Lett. 84, 2901-2904 (2000); and Szuecs, F., Kim, C. P. & Johnson, W. L., Acta Mater. 49, 1507-1513 (2001), the disclosures of which are incorporated herein by reference.) For example, a BMG matrix composite was discovered in $La_{74}Al_{14}(Cu,Ni)_{12}$ whereby 5% tensile ductility was achieved with 50% volume fraction of soft second phases. (See, e.g., Lee, M. L. et al., Acta Mater. 52, 4121-4131 (2004), the disclosure of which is incorporated herein by reference.) Although the La-based composite exhibited an ultimate tensile strength of only 435 MPa, the alloy demonstrated that the properties of the monolithic metallic glass ($La_{62}Al_{14}(Cu, Ni)_{24}$) could be greatly improved through the introduction of a soft second phase. Other desirable composite systems are those with lower density (as with Al-containing alloys) or with higher strength (as with Fe-based alloys).

Recently it has been discovered that the enhanced material properties of these composites are directly related to the size, structure, density and distribution of the crystalline particulate phase within these composites. (See e.g., U.S. Pat. No. 7,883,592 B2, the disclosure of which is incorporated herein by reference.) In particular, in that work the BMG composites were formed such that the microstructure of the metallic glass composite was engineered for optimum mechanical performance. The two basic principles are: (1) introduction of 'soft' elastic/plastic inhomogeneities in a metallic glass matrix to initiate local shear banding around the inhomogeneity; and (2) matching of microstructural length scales (for example, dendrite size L and dendrite spacing S) to the characteristic plastic zone radius of the glass $R_p$ (the size associated with plastic shielding of an opening crack tip) to limit shear band extension, suppress shear band opening, and avoid crack development. Using that method it was found that it was possible to produce BMG Composites having vastly superior mechanical properties. For example, it was possible to obtain composites with tensile ductility ranging from 0-20%, total strain to failure from 1.5-25%, Charpy impact toughness >25 J, plane strain fracture toughness >100 MPa m$^{1/2}$, room temperature rolling >5%, a reduction in area of >20% in tension. The composites also demonstrated homogeneous deformation during tension with shear band size less than 10 micron.

One of the key features uncovered in that invention is that the properties of the composites depend intimately on the microstructure morphology, e.g. final dendrite size, volume and distribution of dendrites in the glassy matrix, etc. For example, it was determined that the improved properties of the composite materials, such as tensile ductility, are a function of dendrite size and spacing. In particular, it was determined that the improved properties of these materials are directly related to the fact that the dendrite morphology is uniform throughout the sample, and specifically the size, volume fraction and spacing of the dendrites remains within a specified range. In contrast, in uncontrolled processing where the BMG Composite is cooled from a molten state, the tensile ductility is less than 1%, as regions where the dendrite size varies and is less than 10 micron develop during processing. Accordingly, it is essential that in forming joints between BMG Composite materials in accordance with the current invention that the process not alter the size, shape, density or distribution of the dendritic phase of the composites.

In conventional joining processes of traditional non-BMG metal composites, the goal is to render the joining material molten without much regard to conserving the internal microstructure of the material. This is because the matrix in traditional metal composites is crystalline, which deforms plastically by mechanisms that are fundamentally different than BMG (dislocation motion rather than shear band propagation). Consequently, the mechanical performance of non-BMG metal composites is much less critically linked to the microstructure morphology. Specifically, the deformation of non-BMG composites is not faced with propagating shear bands turning into cracks, and there is no need to arrest such shear bands in order to promote toughness and ductility. As such, when joining non-BMG composites it is not as critical to precisely preserve the microstructure morphology as it would be for the case of BMG Composites. Moreover, when joining non-BMG composites, it is not critical to bypass the crystallization of the matrix, as the matrix in such composites is already crystalline. By contrast, in the joining of BMG Composites, one has to cope with (i) preserving the morphological length scales of the microstructure, (ii) preserving the amorphous structure of the matrix through the glass transition and up to temperatures as high as the solidus temperature or beyond, and (iii) ensure that the cooling of the heated and softened interface is rapid enough to re-vitrify the matrix without crystallizing.

Figure 2:
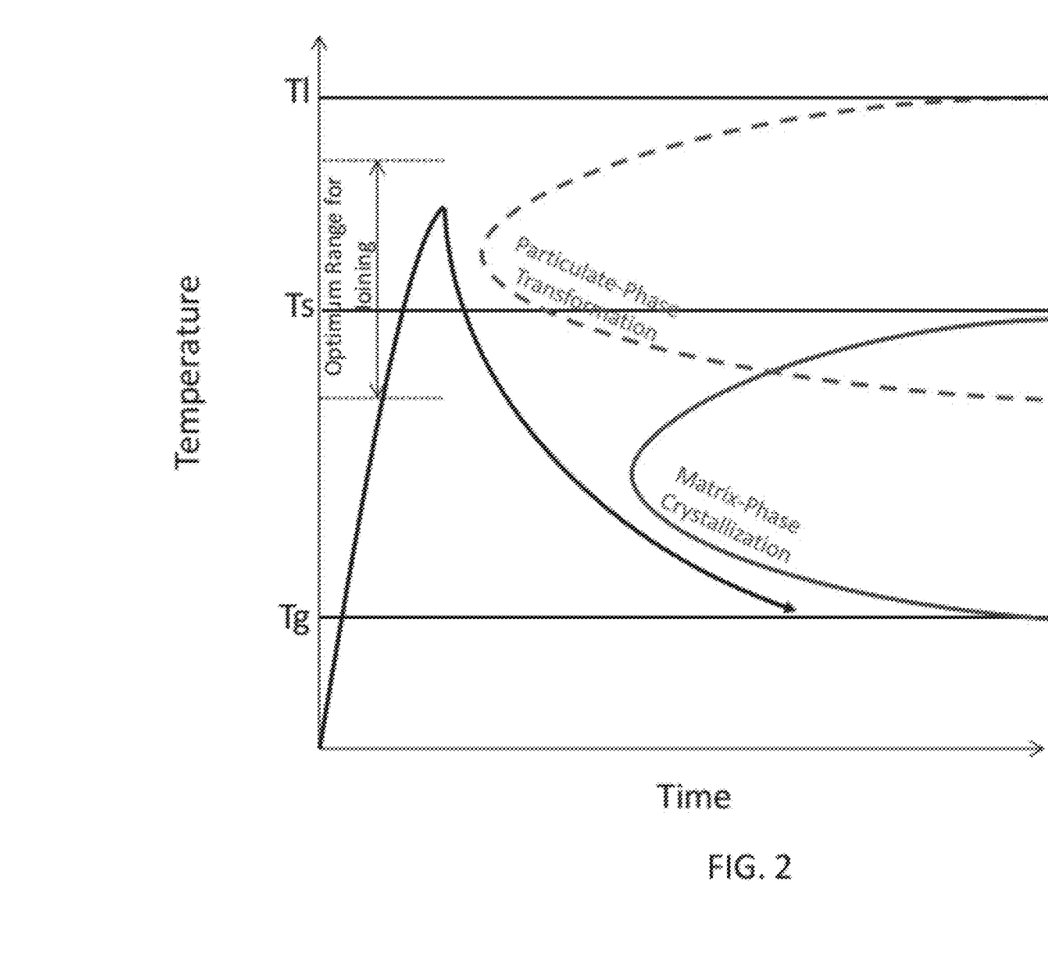
FIG. 2 presents a TTT diagram illustrating the kinetics of matrix-phase crystallization and particulate-phase transformation in relation to the heating and cooling curves during joining.

The challenges faced with joining BMG Composites are illustrated schematically in FIG. 2. A schematic TTT diagram is presented showing TTT curves for eutectically crystallizing the amorphous matrix phase, and for transforming (e.g. coarsening/melting) the crystalline particulate phase. The interfacial heating and cooling history is also presented, showing that the heating and cooling curves must bypass both TTT curves in order to preserve the amorphicity of the matrix phase and the morphology of the particulate phase. An optimal range for joining, over which the viscosity of the matrix is adequately low to promote fusion and joining, is indicated in relation to the glass-transition, solidus and liquidus temperatures, Tg, Ts, and Tl. As previously described, past efforts to shape and join BMG composites have been unaware of the importance of the TTT curve related to the transforming the particulate phase, and as a result have been satisfied with merely avoiding the TTT crystallization curve.

The current invention addresses these deficiencies. In particular, in some embodiments the joining method incorporates an interface heating rate that is high enough and localized enough such that:

the matrix remains amorphous throughout the entire heating process;
the interface temperature reached is high enough to give rise to low enough viscosity such that it promotes sufficient joining at the interface under the applied pressure;
the total time spent above the solidus temperature is short enough to inhibit any spatial or structural transformation of the particulate crystalline phase (e.g. the dendrites); and
the heating is localized enough such that free cooling by conduction through the surrounding material is sufficiently rapid to enable re-vitrification of the interfacial matrix material.

Although the above discussion has focused on the process for forming joints, it should be understood that the current application is also directed to joints formed from a BMG composite material. In selecting the materials for forming such joints, it should be understood that it is preferable to have two BMG materials that are as compositionally and structurally similar as possible to ensure chemical and structural continuity across the joint, thereby warranting good mechanical integrity of the joint. In particular, in a most preferred embodiment, the joint would be formed of two BMG composites of identical or very similar composition and microstructure. In other embodiments, where it is desired to use a composite with a non-composite BMG material, it is preferred that the composition of the amorphous matrix phase of the composite be identical to or very similar to the composition of the non-composite BMG material. In above discussion, it should be understood that the composition and structure of the materials is critical only for the local region around the interface that is to be formed into a joint. Other materials including non-BMG materials may be included, as long as these materials do not make-up any portion of the joint to be formed.

EXEMPLARY EMBODIMENTS

Example 1

Rapid Capacitor Discharge

The rapid heating of BMG Composites may be achieved in any number of ways, including, in some embodiments, via a rapid capacitive discharging ("RCD") mechanism. In this context, RCD refers to discharging a capacitor through a configuration with the intent of rapidly heating it. RCD has previously been used in conjunction with BMGs. (See e.g., U.S. Pat. Pub. 2009/0236017, the disclosure of which is incorporated herein by reference.) For example, U.S. Pat. Pub. 2009/0236017 discloses using RCD to rapidly and uniformly heat a BMG to a processing temperature, where the BMG may then be shaped as desired. Indeed, the publication discloses achieving heating rates as high as $10^5$ K/s. (See, e.g., U.S. Pat. Pub. 2009/0236017, the disclosure of which is incorporated herein by reference.) However, the RCD technique described in that publication is directed to a method whereby the entire sample of BMG material is heated rapidly and uniformly to a temperature sufficient for shaping.

When RCD is applied to the problem of joining two BMG Composite pieces, however, the heating would be localized to the interface between the two pieces while the rest of the material will remain relatively cold. This is because the resistance at the interface would be much higher than elsewhere in the two pieces. Indeed, as further described below, when the RCD process is applied across multiple layers of composites to be joined, the heating can still be localized at all joint locations, which are the regions of greatest resistance. This is highly desirable, as multiple layers of BMG Composites can be joined in a single capacitive discharge.

More specifically, in these embodiments, the composite is loaded between two electrodes and energy is discharged from a capacitor (initial energies ranged from 15-60 J). The matrix material is rapidly heated locally at the joint between the objects to above its glass transition but below its crystallization temperature over a time scale of milliseconds (related to the circuit time constant for capacitive discharge). The forging load causes the matrix from each panel to be thermoplastically joined and then cooling through conduction across the bulk materials returns the heated matrix to a glassy state (re-vitrification). The result is a continuous union with no heat-affected zone and a joint that is as strong and tough as the parent material alone.

Figure 3:
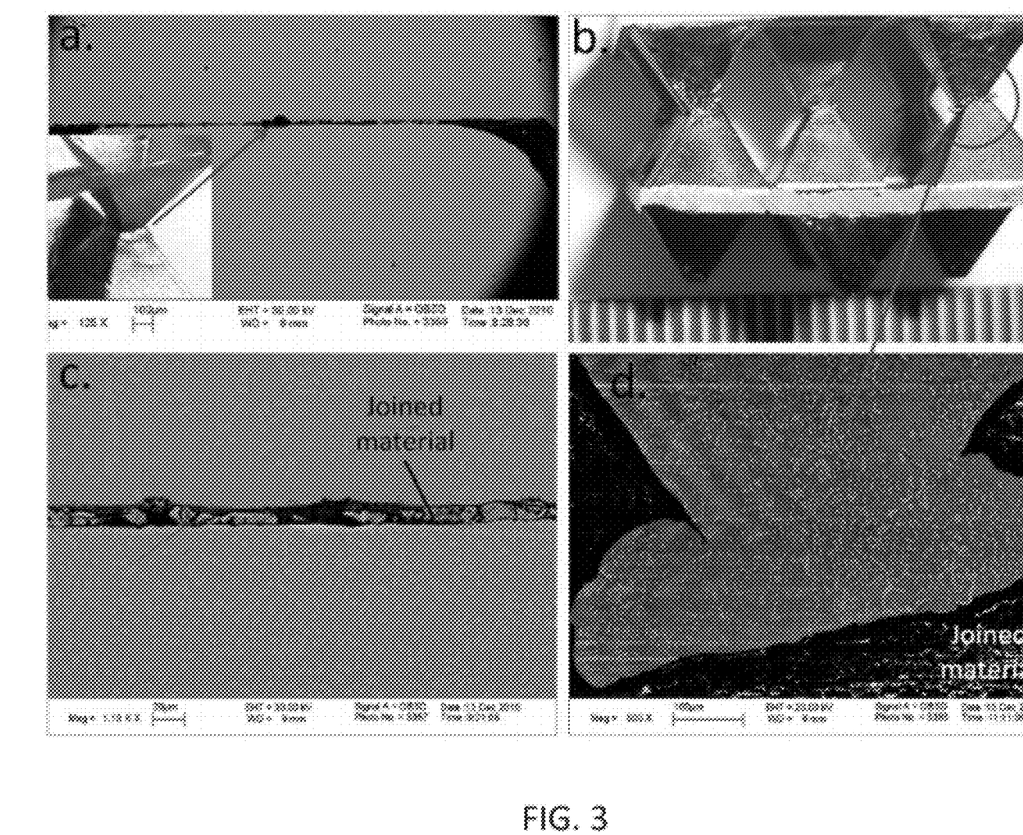
FIGS. 3A to 3D depict micrographs of BMG Composites that were joined in accordance with an embodiment of the invention.
Figure 4:
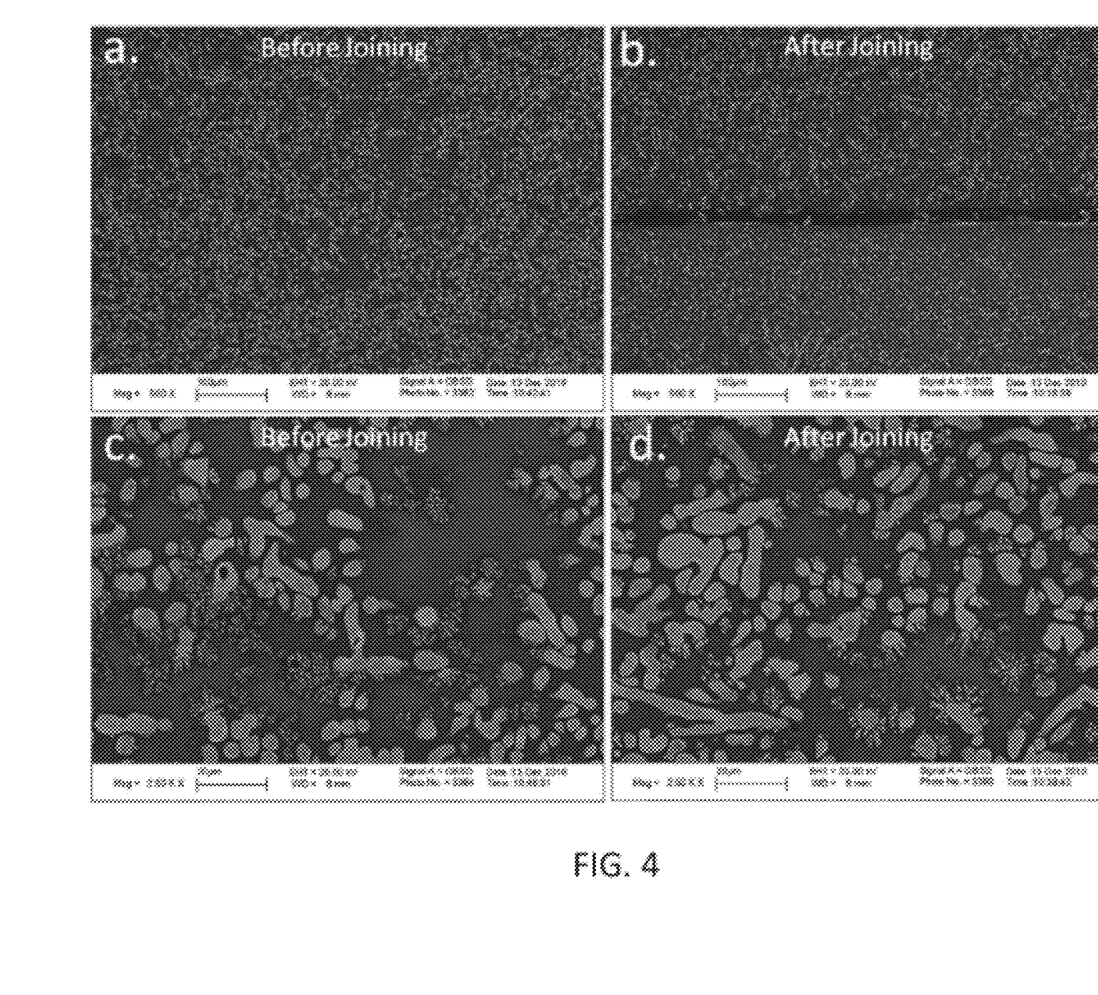
FIGS. 4A to 4D further depict micrographs of BMG Composites that were formed in accordance with embodiments of the invention that illustrate that the microstructure of the secondary phase appears to be virtually unchanged.

Importantly, it has been discovered that RCD allows the sample to be heated sufficiently rapidly such that the both the amorphous matrix and crystalline particulate retain their respective structure and geometry, as the results of the studies below will illuminate. For example, in one study RCD was utilized to join two composite pieces together thermoplasically using 15 J of energy. FIG. 3 provides images of a micrograph of the thermoplastically formed joint, shown in the inset. The polishing makes it appear that an intimate bond has not been formed, but (3c) demonstrates that there is a region of joined material, and a close-up view of the nodes of two structures along with a backscattered image of the microstructure, shown in (3d) demonstrate that while the glass matrix phase has been heated and formed (squished) the dendritic microstructure is unaffected. Likewise, FIG. 4 provides backscattered SEM micrographs from a strut in the BMG composite egg box before (4a & c) and after (4b & d) has been joined. These images demonstrate that the microstructure of the composite is unchanged during the thermoplastic joining process, even though the matrix has been heated and formed.

Example 2

Creating Cellular Solid Structures that Include BMG Composites

In some embodiments, this joining process may be used to create cellular solid structures in accordance with embodiments of the invention. For the purposes of this invention, a cellular solid is defined as a structure made up of an interconnected network of solid struts or plates which form the edges and faces of cells. (Gibson, Cellular Solids: Structure and Properties, 2nd edition, pg. 2, the disclosure of which is incorporated herein by reference.) Cellular solids are useful in a wide variety of applications including automotive, aeronautical, and sporting good applications. It is commonly understood that the effectiveness of these structures is directly dependent on the specific strength of the base material used. (See e.g., U.S. Pat. Pub. US 2009/0053476 A1, the disclosure of which is incorporated herein by reference.) Thus, U.S. Pat. Pub. US 2009/0053476 A1 discloses using BMGs as base materials for cellular solids to enhance their effectiveness, since BMGs typically have superior yield strengths as compared to crystalline metals, which have conventionally been used as base materials. (Id.)

However, the use of BMGs within a cellular solid is somewhat limited by the BMGs' relatively low fracture toughness. (See citation above.) Specifically, a BMG's fracture toughness can be related to its 'plastic zone radius,' $R_p$, which reflects the thickness below which the material resists crack formation. If a BMG sample is thicker than its plastic zone radius, it will fail catastrophically upon sufficient stress (i.e. it will undergo brittle fracture without any appreciable plastic deformation), which is an undesirable result. Typical plastic zone radii for metallic glasses range from a few micrometers to several hundred micrometers. Thus, for a cellular solid structure to be formed from a BMG, it is preferable for the thickness of the cell walls to be less than $R_p$, so as to minimize the likelihood of brittle fracture. This is a considerable limitation on the geometry of cellular solids that comprise BMGs. By contrast, 304 Stainless Steel has a plastic zone radius of approximately 30 mm, allowing cell walls to be much thicker while resisting cracking.

As described above, BMG Composites on the other hand typically have a much greater fracture toughness that can result in plastic zone radii on the order of several millimeters. (See e.g., U.S. Pat. No. 7,883,592). Thus, by including BMG Composites as a base material in cellular solids, cellular solids can be formed much more effectively. The joining processes disclosed herein enable the fabrication of cellular solids that include BMG Composites. Importantly, the disclosed joining processes do not compromise the microstructure of the BMG Composites, thereby allowing cellular solids to inherit the enhanced properties that BMG Composites offer.

Figure 5:
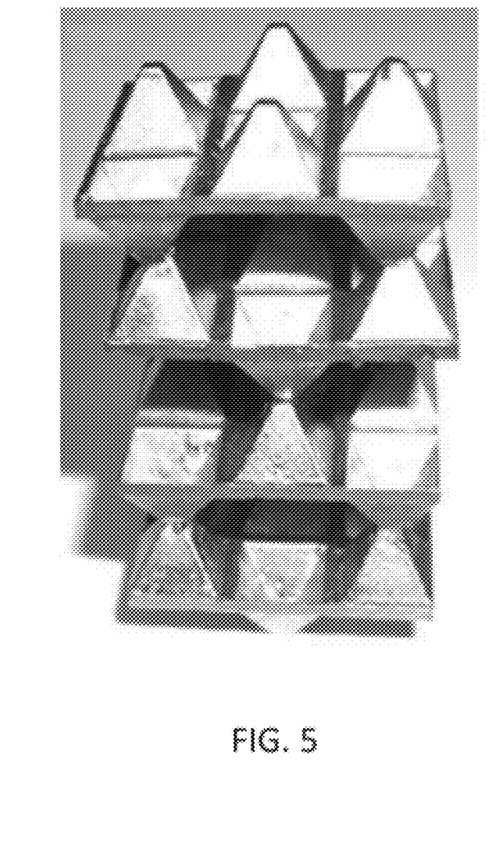
FIG. 5 illustrates a cellular solid in the shape of an egg box structure that has been fabricated in accordance with an embodiment of the invention.
Figure 6:
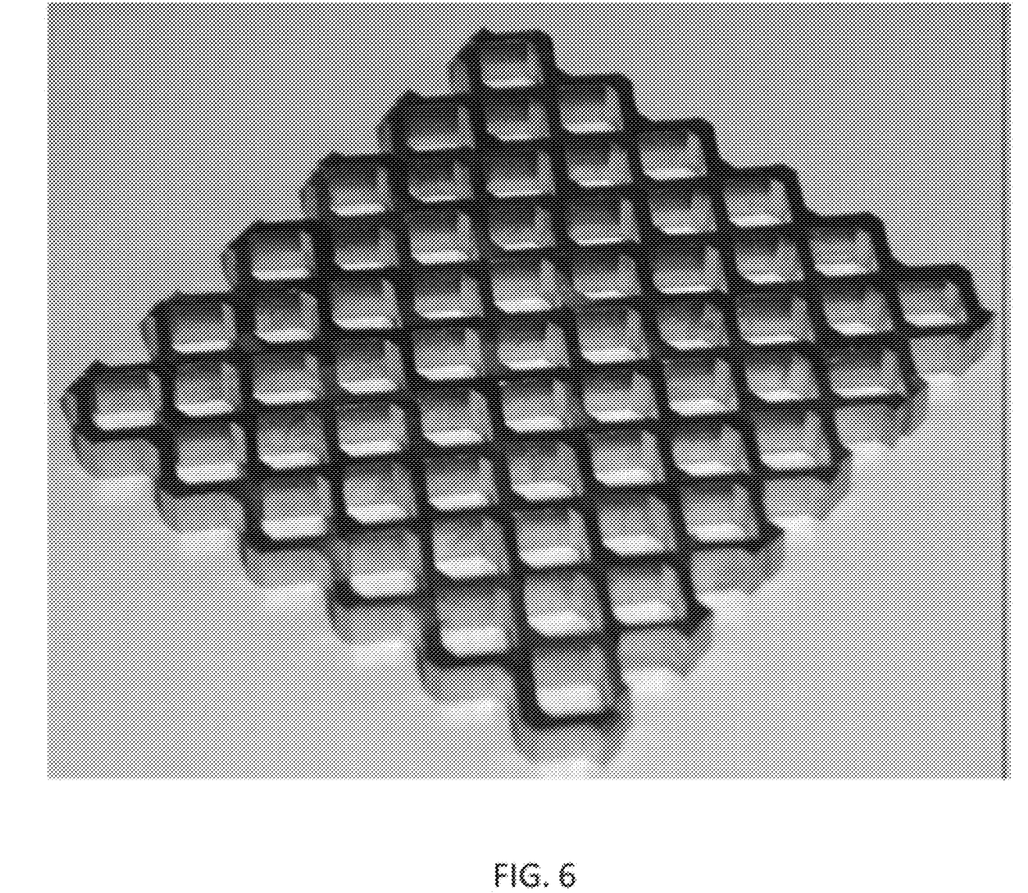
FIG. 6 illustrates a honeycomb structure that has been fabricated in accordance with embodiments of the invention.

Additionally, the use of RCD in conjunction with the joining processes described herein in accordance with embodiments of the invention can allow for multiple BMG Composite layers to be joined simultaneously. This is highly desirable, as it can greatly facilitate the fabrication of cellular solid structures. Some embodiments relating to the simultaneous joining of multiple BMG Composite layers is described in Examples 3 and 4 below. FIG. 5 illustrates a cellular solid in the shape of an egg box structure that has been fabricated in accordance with an embodiment of the invention. The egg box cellular solid may be fabricated in accordance with the indirect application of a compressive load and RCD across multiple layers of BMG composites in accordance with embodiments of the invention described above. FIG. 6 illustrates a honeycomb structure that has been fabricated in accordance with embodiments of the invention.

Example 3

Directly Joining BMG Composites

Figure 7A:
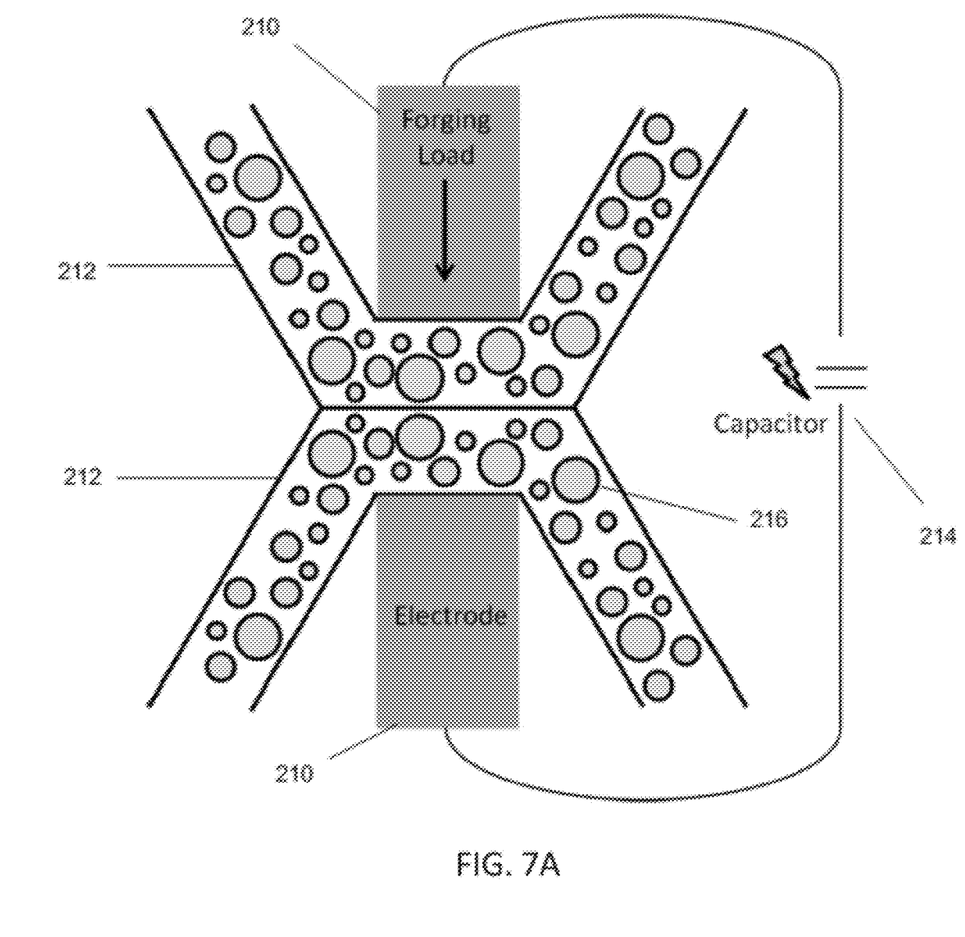
FIG. 7A illustrates directly applying a forging load and a rapid capacitive discharge across two BMG Composites in accordance with an embodiment of the invention.
Figure 7B:
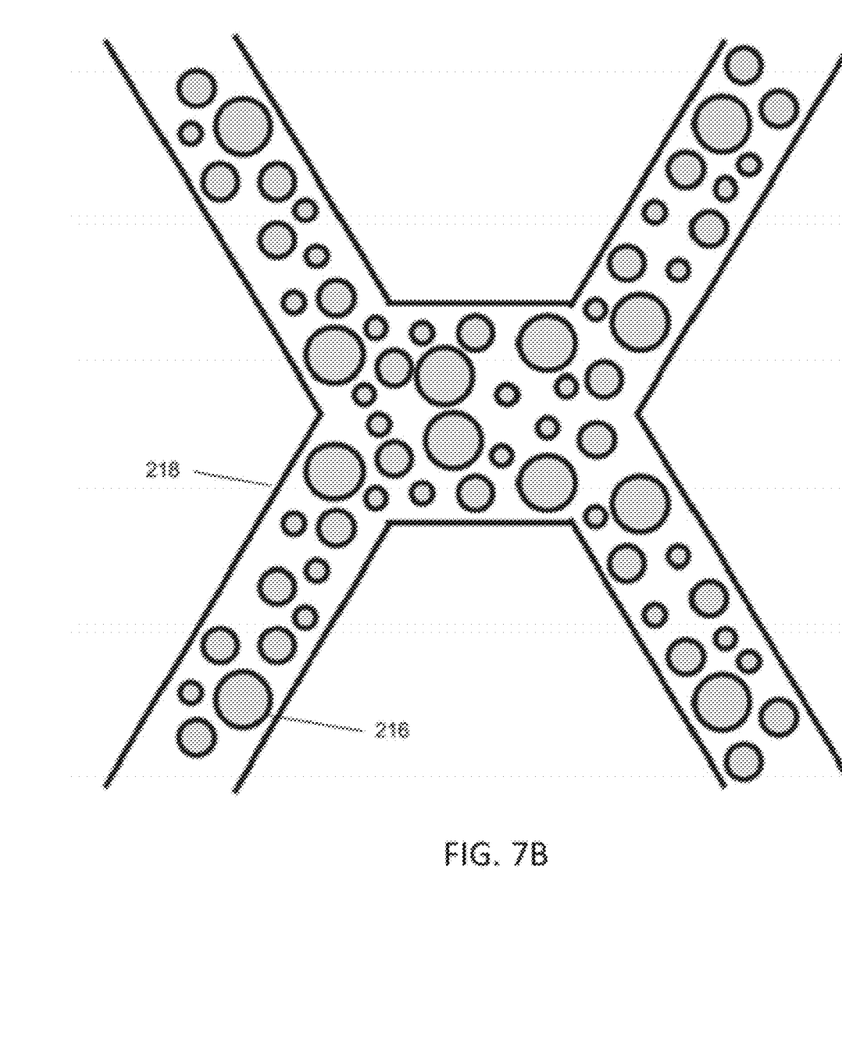
FIG. 7B illustrates the result of applying a forging load and a rapid capacitive discharge across two BMG Composites in accordance with an embodiment of the invention.

In some embodiments, BMG Composites may be joined by directly applying a compressive load and RCD to a desired joining point in accordance with embodiments of the invention. This is illustrated in FIG. 7A. Note that in the illustrated embodiment, one pair of electrodes 210 acts to apply both a compressive load as well as an electrical discharge across two BMG Composites 212. As described above, the capacitor 214 is particularly configured to heat the joint to a temperature that causes the matrices of BMG Composites 212 to enter into a viscous state such that they fuse into one another (interfuse) without altering the structure or morphology of the dendrites. Thus, the inclusions 216 are left intact. Related FIG. 6B illustrates that the materials are joined and that the inclusions 216 are left unperturbed by the joining process.

Figure 8A:
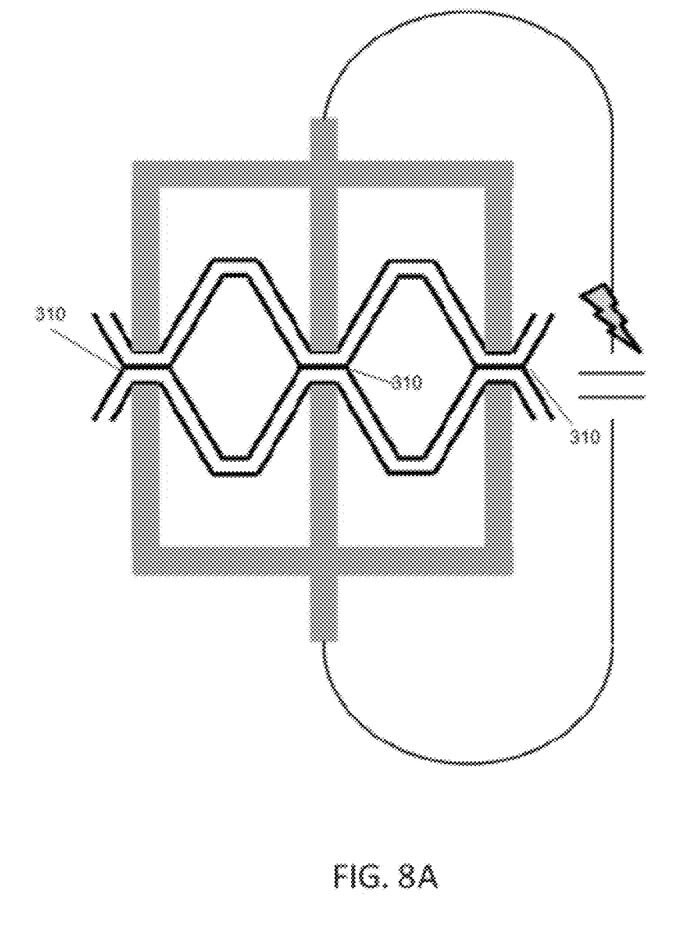
FIG. 8A illustrates simultaneously creating multiple joints in accordance with an embodiment of the invention.
Figure 8B:
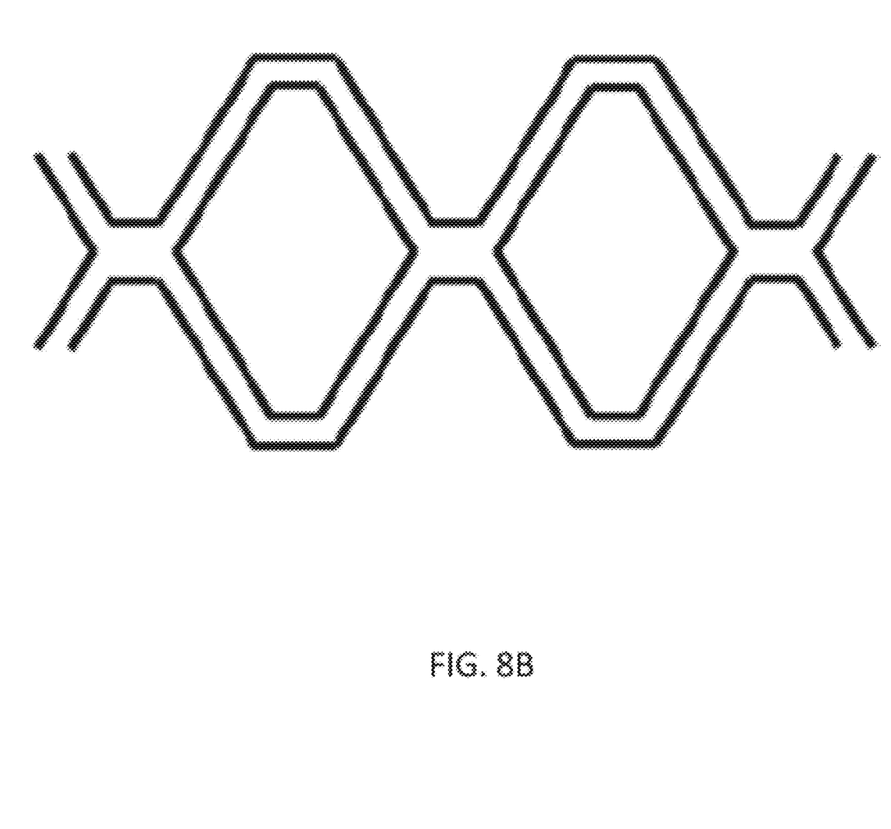
FIG. 8B illustrates the result of creating multiple joints in accordance with an embodiment of the invention.

The application of multiple simultaneous compressive loads and RCDs in accordance with embodiments of the invention is illustrated in FIG. 8A. The process is similar to that in FIG. 7A, except that multiple joints 310 are simultaneously formed. FIG. 8B illustrates the resulting joints.

Example 4

Indirectly Joining Multiple Layers of BMG Composites

Figure 9A:
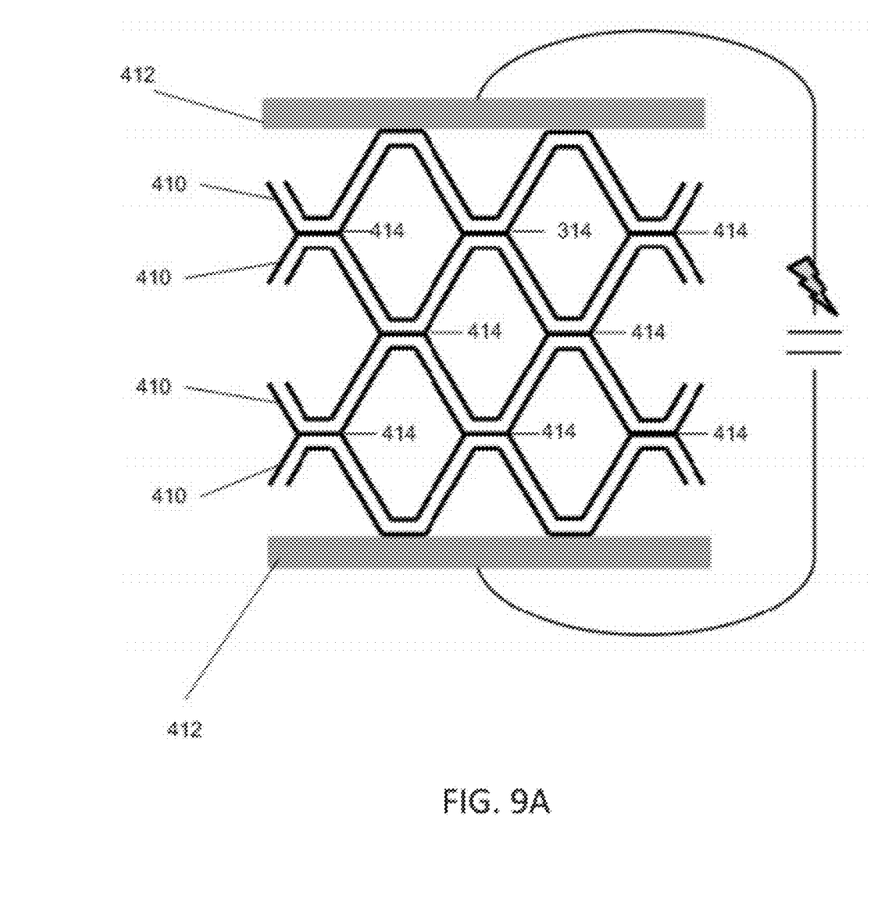
FIG. 9A illustrates applying a forging load and a rapid capacitive discharge across multiple layers of BMG Composites in accordance with an embodiment of the invention.
Figure 9B:
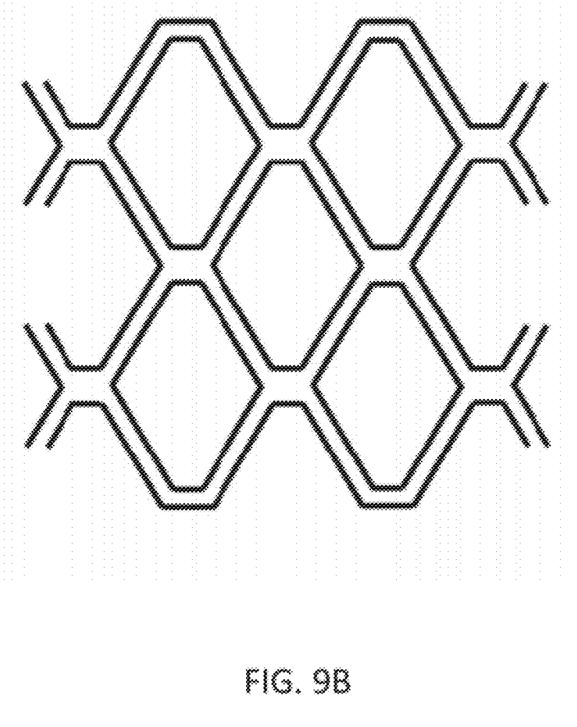
FIG. 9B illustrates the result of applying a forging load and a rapid capacitive discharge across multiple layers of BMG Composites in accordance with an embodiment of the invention.

In other embodiments, multiple layers of BMG composites may be joined by indirectly applying a compressive load and RCD across the multiple layers in accordance with embodiments of the invention. The indirect application of both a compressive load and RCD across multiple layers of BMG composites to join them in accordance with an embodiment of the invention is illustrated FIG. 9A. Multiple BMG Composite layers 410 are configured so as to form a honeycomb structure. A compressive load in conjunction with RCD 412 is applied to the configuration in accordance with embodiments of the invention described above. Again, the RCD acts to raise the temperature at the interface above the glass transition temperature at a high enough rate attaining low enough viscosities such that effective joining takes place without altering the morphology of the particulate phase. Also, the temperature increase is highly localized to the joint locations 414, such that cooling occurs rapidly enough by conduction to the adjacent material thereby allowing the matrix to re-vitrify. Related FIG. 9B depicts the resulting structure.

DOCTRINE OF EQUIVALENTS

Those skilled in the art will appreciate that the foregoing examples and descriptions of various preferred embodiments of the present invention are merely illustrative of the invention as a whole, and that variations in the steps and various components of the present invention may be made within the spirit and scope of the invention. For example, it will be clear to one skilled in the art that additional processing steps or alternative configurations would not affect the improved properties of the joining method of the current invention nor render the method unsuitable for its intended purpose. Accordingly, the present invention is not limited to the specific embodiments described herein but, rather, is defined by the scope of the appended claims.

What is claimed:

1. A method of joining a plurality of objects comprising:
   providing a plurality of objects, each object having at least one metallic glass portion, wherein at least one of the metallic glass portions of at least one of the plurality of objects is formed from a bulk metallic glass composite material having both an amorphous matrix phase and at least one crystalline particulate phase;
   arranging the objects such that the at least one metallic glass portion of each object is in direct contact with the metallic glass portion of at least one of the other objects to thereby form at least one contact point;
   applying a compressive load such that a force is exerted between the objects at the at least one contact point;
   heating an interfacial region immediately surrounding and including each of the at least one contact points in less than about 100 milliseconds to a processing temperature between the glass transition temperature and the liquidus temperature of the BMG composite such that the metallic glass portions of the plurality of objects soften and interfuse to form a joint at the at least one contact point;
   wherein the heating and joining time is sufficiently short to prevent crystallization of the amorphous matrix and without altering the microstructure morphology of the crystalline particulate phase; and
   wherein the heating is sufficiently localized within the interfacial region such that the joint can be cooled via conduction through the material surrounding said interfacial region sufficiently fast to ensure re-vitrification of the amorphous matrix phase within the interfacial region.

2. The method of claim 1, wherein the processing temperature is sufficiently above the glass-transition temperature of the composite material such that the metallic materials of the objects have a sufficiently low viscosity to allow the materials to sufficiently interfuse to form the joint under the exerted force.

3. The method of claim 1, wherein the heating is achieved by discharging a quantum of electrical energy across at least two objects.

4. The method of claim 3, wherein electrical energy is discharged via a capacitor.

5. The method of claim 3, where in the quantum of electrical energy applied is approximately between 10 J and 100 J.

6. The method of claim 1, wherein the amorphous matrix is heated to between the solidus and liquidus temperatures in a time less than about ten milliseconds.

7. The method of claim 1, wherein the compressive load and the heating are directly applied to the at least one contact point where the joint is formed.

8. The method of claim 1, wherein the heating is simultaneously applied to a plurality of joints.

9. The method of claim 1, comprising at least three objects arranged in successive layers.

10. The method of claim 9, wherein the compressive load and heating are directly applied only to the outer layers.

11. The method of claim 1, wherein the at least one bulk metallic glass composite has a plastic zone radius of at least 1 mm.

12. The method of claim 1, wherein the plurality of objects are arranged so that their joining results in a cellular solid structure.

13. The method of claim 12, wherein the resulting cellular solid structure is an egg box shaped structure.

14. The method of claim 12, wherein the resulting cellular solid structure is a honeycomb-shaped structure.

15. The method of claim 12, wherein the resulting cellular solid structure is about 90% porous.

16. The method of claim 12, wherein the resulting cellular solid structure has a density of about 0.5 g/cc.

17. The method of claim 1, wherein the microstructure of the composite material is substantially uniform throughout the object.

18. The method of claim 1, wherein the particulate phase is homogeneously distributed throughout the composite and wherein the average spacing of the particulate phase is on the order of magnitude of the plastic zone radius of the amorphous matrix phase ($R_p$).

19. The method of claim 1, wherein the metallic glass portions of all of the objects have sufficiently similar composition to ensure chemical continuity across the joint.

20. The method of claim 1, wherein the microstructures of all of the objects have sufficiently similar morphology to ensure structure continuity across the joint.

* * * * *